United States Patent Office 3,267,056
Patented August 16, 1966

3,267,056
THICKENING COMPOSITIONS COMPRISING A SILICEOUS AMINO COMPOSITION AND HYDROGENATED CASTOR OIL
Frederick J. Ihde, Jr., Mountain Lakes, and Joseph Cunder, East Orange, N.J., assignors to Nopco Chemical Company, Newark, N.J., a corporation of New Jersey
No Drawing. Filed Mar. 1, 1962, Ser. No. 176,794
9 Claims. (Cl. 260—22)

This invention relates to thickening agents. More particularly, this invention relates to thickening and thixotropic agents for polyester containing materials.

Polyester containing materials by themselves, are generally slightly viscous materials. In order to make these liquids thicker for the purpose of retarding the free flowing characteristics of these materials, additives are often used to thicken liquid polyester containing materials. These additives generally are silicas, organophilic silicates, metallic soaps and the like. However, these additives suffer from a number of disadvantages. The organophilic silicates do not thicken polyester containing systems merely by adding such a silicate to the polyester containing system and mixing. In order to thicken a polyester containing system with an organophilic silicate, the entire mixture has to be agitated very rapidly, homogenized, or colloid milled. The use of metallic soaps as thickeners is limited due to the generally low thickening power of such soaps. When silica is used, an excessively long period of time is required to incorporate the silica into the polyester containing system.

Nopco Chemical Company Bulletin DS-1 on page 3 suggests the use of a particular siliceous amino compound, as a thickening and thixotropic agent for polyester resins. Moreover, on pages 7 through 12 of said bulletin, graphs are presented showing the thickening effect of this particular siliceous amino compound on castor oil and other organic liquids. However, it was found that while this particular siliceous amino compound when used as a thickener, resulted in an improved thickened polyester containing composition, it was felt that greater thickening and thixotropic power was possible than that so far achieved using this particular siliceous amino compound.

Accordingly, it is an object of this invention to prepare compositions which have improved thickening and thixotropic properties when added to free-flowing polyester compositions.

Another object of this invention is to prepare thickening and thixotropic agents which can be easily incorporated into polyester containing systems.

Other objects and advantages will become apparent from the following more complete description and claims.

As used in the specification and claims, the term siliceous amino compound describes a siliceous amino compound prepared using isophthalic acid, terephthalic acid, or their water-soluble salts, and using fluosilicic acid or water-soluble fluosilicate salts. Preparation of the compounds used in this invention are described in copending patent application Serial No. 107,320, filed May 3, 1961, Ihde, now U.S. Patent No. 3,129,178. The disclosure contained in said copending patent application is hereby incorporated into the present case by reference.

Broadly, this invention contemplates a composition of matter comprising a siliceous amino compound and a powdered hydrogenated castor oil.

This invention also contemplates a process of thickening free-flowing polyester containing materials comprising the steps of adding to said materials and blending therewith a composition containing a siliceous amino compound and a powdered hydrogenated castor oil.

Generally speaking, this invention can be practiced by adding a mixture of a siliceous amino compound as aforedefined, and a powdered hydrogenated castor oil to a free-flowing polyester containing material and blending the entire mixture by simple mixing or in any other suitable manner.

In general, a siliceous amino compound can be prepared by reacting a water-soluble silicate salt, such as sodium silicate, ammonium silicate, and the like, with a salt of a partial amide, such as the acetate salt of the monoamide of hydrogenated tallow fatty acids and tetraethylene pentamine and the like; amine acid addition salts such as the phosphoric acid salt of dioctyl amine and the like; quaternary ammonium salts such as dimethyl dioctadecyl ammonium chloride and the like; imidazoline salts such as the sulfate salt of the imidazoline of two moles of stearic acid and one mole of diethylene triamine, and the like; oxazoline salts such as the acetate salt of the oxazoline of one mole of monoethanolamine and one mole of lauric acid, and the like.

If desired, an amount of the water-soluble silicate salt can be used in the reaction which is more than sufficient to react with all of the partial amide salt, imidazoline salt, etc. In such a case, the final product will contain free or uncombined silica. Free or uncombined silica may also be present in the final product by reacting the water-soluble silicate salt with the oxazoline salt, quaternary ammonium salt, etc., in the presence of colloidal silica such as a silica gel, silicic acid, hydrated silica, and the like.

If desired, a water-insoluble organic liquid, such as n-butanol, can be added at any stage of the preparation as long as it is present at the time of formation of the siliceous amino compound.

The siliceous amino compound which is used in this invention is one prepared in the aforementioned copending patent application. When preparing such a siliceous amino compound, using isophthalic or terephthalic acid, or their water-soluble salts, the final product may, if desired, have isophthalic acid or terephthalic acid remain as a component thereof; or the acid may be removed in the form of the water-soluble isophthalate or terephthalate salts. If the acid is to be present in the final composition, it is initially present as the water-soluble salt and then converted to the free acid with an acid such as sulfuric acid, at any time before the product is filtered. Moreover, the final product may have up to 95% by weight of free silica and may contain an organic material which is normally a liquid at the operating temperature of the process. In addition, fluosilicic acid or a water-soluble fluosilicate salt is used in the preparation of such siliceous amino compounds. The manner of preparing such siliceous amino compounds is aptly described in the aforementioned copending patent application.

The hydrogenated castor oil which can be used must be finely powdered such as a hydrogenated castor oil which has been jet milled or the like. The melting point of the hydrogenated castor oil must be high enough so that it will not melt when being jet milled, etc. We prefer to use a hydrogenated castor oil known as Harthix. Harthix has a melting point of 86° C. to 88° C., a saponification number of 176 to 182, a maximum iodine number of 3.0, a maximum acid number of 4.0 and an average size of 1.8 microns.

The mixture of siliceous amino compound and hydrogenated castor oil can contain from about 25% to 75% of siliceous amino compound by total weight of said mixture. If these proportions are varied to any great extent, the thickening will not be as desirable.

The thickening compositions of this invention can be added to any free-flowing polyester containing composition in an amount of from about 0.5% to 10% based upon the weight of the polyester present. If less than 0.5% is used, then an insufficient thickening and thixotropic effect will be obtained. Amounts between about 7% and 10% will generally result in thickening the material to the point where it is not a free-flowing material. If a non-free flowing material, such as a solid gel, is not desired, then the compositions of this invention should be used in amounts of up to about 7% as aforedescribed.

Our thickening compositions can be used to successfully thicken any polyester containing free-flowing composition including liquid polyesters as well as solid polyesters dissolved in a suitable solvent. Among the polyesters to which our thickening compositions can be applied are saturated and unsaturated polyesters prepared by the polyesterification of a dicarboxylic acid or an anhydride with a polyhydric alcohol or glycol.

Exemplary of such dicarboxylic acids are the following as well as their mixtures: maleic, fumaric, itaconic, citraconic, mesaconic, succinic, adipic, methyl adipic, sebacic, malonic, oxalic, suberic, phthalic, terephthalic, isophthalic, tartaric, cyclohexane-1,2-dicarboxylic, cyclohexane-1,4-dicarboxylic, naphthalene-1,2-dicarboxylic, isosebacic, azelaic, citric, lactic, polyacrylic, thiodipropionic, and the like, and anhydrides such as maleic anhydride, phthalic anhydride, and the like.

Exemplary of the polyhydric alcohols or glycols which can be used to prepare a polyester which can be thickened by using the compositions of this invention are the following as well as their mixtures: ethylene glycol, di-, tri- and poly-ethylene glycols, 1,2-propylene glycol, 1,4-butylene glycol, hexamethylene glycol, styrene glycol, decamethylene glycol, 1,3-butylene glycol, glycerine, 1,6-hexane diol, pentaerythritol, trimethylol propane, hexane triol, trimethylol ethane, 2-methyl pentane diol-2,4, 2,ethylhexanediol-1,3, sorbitol, and mannitol, and the like. The above exemplification is presented for the purpose of illustration only and is not to be considered as all inclusive or as limiting the scope of this invention as other polyesters and polyester containing compositions, which are known in the art, may be used as for example Vibrin 117. Vibrin 117 is a propylene glycol, phthalic anhydride, maleic anhydride system in a mole ratio respectively of about 2 to 1 to 1. It is a styrene modified air cure resin which indicates that it contains a small amount of wax.

After the free-flowing polyester containing composition has been thickened, cross-linking of the polyester, if the polyester is unsaturated, is accomplished by treatment with a vinyl compound capable of co-polymerizing with the polyester, e.g., styrene. The amount of vinyl monomer used is usually about 25% to 50% by weight based on the weight of the polyester plus vinyl monomer. Cross-linking is generally accomplished by free radical polymerization, the free radical being generated by thermal or photolytic means or by decomposition of a free radical forming substance, e.g., benzoyl peroxide, diacetyl peroxide, etc. Other useful cross-linking agents are α-methyl styrene; alkyl styrene, e.g., o-methyl styrene, p-ethyl styrene, 2,4-dimethyl styrene; diallyl phthalate, esters of acrylic and methacrylic acid, such as methyl methacrylate; acrylonitrile, vinyl pyrrolidone, vinyl pyridine and ethyl vinyl pyridine. Cross-linking of a saturated polyester can be accomplished using, for hydroxyl terminated polyesters, polysiocyanates such as toluene di-isocyanate, di- and poly-epoxy compounds, anhydrides such as phthalic anhydride, di- and poly-anhydrides such as pyromelitic dianhydride, di- and poly-acids such as sebacic, citric, adipic acids, and the like. If a carboxyl terminated saturated polyester is to be cross-linked, then we can use cross-linking agents such as di- and poly-isocyanates such as methylene-diphenyl-di-isocyanate; glycols and polyols such as ethylene glycol, propylene glycol; polyamines such as diethylene triamine, phenylene diamine; and the like.

The resulting interpolymers of the polyester and cross-linking agents may be used alone or with fillers or other modifying agents, for example, in casting, molding and laminating applications. They may serve as adhesives or as impregnants for many porous bodies such as cork, pottery, felts or fabricated bodies with interstices, e.g., the windings of electrical coils, netted fiber, interwoven fibrous materials, etc. They also may be used for protectively coating articles or substrates such as paper, wood, cloth, glass fibers, concrete, metals, other resinous or plastic materials, etc. They also may be employed in the production of wire enamels and winding tapes. The mixed components or partial interpolymers thereof, with or without modifying agents, may be cast and molded under heat or under heat and pressure. They may be molded by compression molding techniques whereby they are heat and pressure-hardened to yield molded articles of manufacture for various industrial, household and novelty uses.

When moldings or laminates, or for that matter, coatings are to be prepared, various fillers, pigments, dyes, etc., may be added to the mixture of unsaturated polyester and cross-linking agents. Exemplary of such ancillary ingredients are: lignocellulose materials such as wood flour and wood fiber, alpha cellulose, paper dust, clay, diatomaceous earths, zein, glass wool, mica, granite dust, cotton flock, steel wool, silicon carbide, paper, cloth of any fiber including glass, sand, silica flour and white, black or colored pigments, e.g., titanium dioxide, iron oxides and barytes.

In order to more fully illustrate the nature of this invention and the manner of practicing the same, the following examples are presented.

In the examples, unless otherwise specified, the hydrogenated castor oil used is Harthix as aforedescribed.

*Example I*

The purpose of this example is to set forth the preparation of a typical siliceous amino compound which can be used in practising this invention.

(A) *Preparation of the silica sol.*—3.0 lbs. of isophthalic acid and 14 lbs. 6 oz. of a 40° Bé. sodium silicate ($Na_2O:3.22SiO_2$) solution were dissolved in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($MgSO_4 \cdot 7H_2O$) dissolved in 15 lbs. of water was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs. 2 oz. of 96% sulfuric acid to 52 lbs. of water was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution with 40 lbs. of water were slowly added at the same time to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C.

(B) *Preparation of the partial amide salt.*—3.0 lbs. of the monoamide of hydrogenated tallow fatty acids and aminoethylethanolamine was dissolved in 60 lbs. of Varnish Makers' and Painters' Naphtha at a temperature of from 80° C. to 85° C. To this clear solution was then added 382 grams of glacial acetic acid thus forming a clear solution of monoamide acetate.

(C) *Preparation of the siliceous amino compound.*—The partial amide salt solution prepared above in part B and a sodium silicate dilution prepared by diluting 36 lbs.

9 oz. of a 40° Bé. sodium silicate ($Na_2O:3.22SiO_2$) solution with 40 lbs. of water, were slowly added at the same time to the silica sol of part A. When the partial amide salt solution and the sodium silicate dilution were added to the silica sol, the water-soluble sodium salt of isophthalic acid formed from the aromatic acid present in the silica sol and dissolved; and the siliceous amino compound was formed at the same time. During this addition, the silica sol was agitated and care was taken to keep the partial amide salt solution in excess at all times to minimize heavy gel formation. The temperature of the slurry was maintained during the addition between 61° C. and 64° C. The filtrate from a filtered sample of the slurry had a pH of 7.5.

The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water-soluble isophthalate salt had been converted to the substantially insoluble isophthalic acid.

(D) *Recovery of the siliceous amino compound.*—The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Micro-Pulverizer through a 1/64" screen. A yield of 28 lbs. of a finely ground material was obtained. The material was then jet milled to a very fine particle size having a high thickening power.

A siliceous amino compound, prepared in substantially the same manner as in this example, was used in Examples II through V.

Example II

The purpose of this example is to illustrate the thickening power and thixotropic effect of the compositions of this invention in a polyester system.

(A) *Amounts of materials used.*—255.0 grams of Vibrin 117 (a polyester containing composition), 45.0 grams styrene (used as a diluent and crosslinking agent), 6.0 grams of the composition of this invention (composed of 50% by weight siliceous amino compound of the type prepared in Example I, and 50% by weight of Harthix, a powdered hydrogenated castor oil) were added to a vessel and mixed with an Oster Malt Mixer for 30 seconds. The blend was then allowed to stand at room temperature but was periodically mixed for 30 seconds at various time intervals as shown in the table below. After each mixing operation, the viscosity was determined with a LV Model Brookfield Viscosimeter. The viscosity data so obtained is set forth below:

THICKENING EFFECT MEASURED IN CENTIPOISES

| Time Interval Between Mixing | Spindle #3 | | | |
|---|---|---|---|---|
| | 6 Rev./min. | 12 Rev./min. | 30 Rev./min. | 60 Rev./min. |
| After initial mixing | 700 | 600 | 560 | 500 |
| 3 minutes | 1,100 | 950 | 700 | 586 |
| 8 minutes | 1,600 | 1,350 | 912 | 720 |
| 16 minutes | 2,400 | 1,750 | 1,100 | 820 |
| 1½ hours | 7,000 | 4,800 | 2,960 | 2,000+ |

As can be seen from the above table, the compositions of this invention bring about enhanced thickening of the polyester composition.

Example III

The purpose of this example is to illustrate that the thickening effect of the composition according to this invention used in Example II, i.e., a mixture of 3 grams of Harthix and 3 grams of the siliceous amino compound is superior to the thickening effect of 6 grams of powdered hydrogenated castor oil used in this example.

(A) *Amounts used.*—The materials and amounts used were identical with the materials used in Example II except that 6 grams of hydrogenated castor oil replaced the 6 grams of the mixture of Example II.

(B) *Procedure.*—The procedure of Example II was repeated. The viscosity data so obtained appears in the following table.

THICKENING EFFECT MEASURED IN CENTIPOISES

| Time Interval Between Mixing | Spindle #3 | | | |
|---|---|---|---|---|
| | 6 Rev./min. | 12 Rev./min. | 30 Rev./min. | 60 Rev./min. |
| After initial mixing | 1,160 | 1,000 | 772 | 596 |
| 3 minutes | 960 | 850 | 700 | 610 |
| 8 minutes | 1,360 | 1,150 | 848 | 684 |
| 16 minutes | 1,960 | 1,550 | 1,000 | 770 |
| 1½ hours | 5,400 | 3,600 | 2,112 | 1,472 |

A comparison of the viscosities obtained in Example III with the viscosities of Example II demonstrates that the polyester thickening effect of 6 grams of the composition of this invention used in Example II, is superior to the thickening effect of 6 grams of hydrogenated castor oil alone, used in this example.

Example IV

The purpose of this example is to show that the siliceous amino compound alone does not exhibit as good a thickening effect as does the synergistic mixture of powdered hydrogenated castor oil plus the siliceous amino compound.

(A) *Amounts used.*—255 grams Vibrin 117 obtained from Naugatuck Chemical Company, 45 grams styrene and 6 grams siliceous amino compound, prepared in a manner similar to Example I were used.

(B) *Procedure used.*—The procedure of Example II was repeated. The viscosity data so obtained appears below.

THICKENING EFFECT MEASURED IN CENTIPOISES

| Time Interval Between Mixing | Spindle #3 | | | |
|---|---|---|---|---|
| | 6 Rev./min. | 12 Rev./min. | 30 Rev./min. | 60 Rev./min. |
| After initial mixing | 560 | 450 | 388 | 314 |
| 1½ hours | 600 | 520 | 408 | 360 |

Example V

The purpose of this example is to show that the range of 25% to 75% of siliceous amino compound, based on the weight of siliceous amino compound and powdered hydrogenated castor oil, is critical. In this example, 80% of the thickening composition is the siliceous amino compound.

The procedure of Example IV was repeated except that 4 grams of the siliceous amino compound and 1 gram of the solid hydrogenated castor oil was used with 170 grams Vibrin 117 and 30 grams styrene. The viscosity data so obtained appears below.

THICKENING EFFECT MEASURED IN CENTIPOISES

| Time Interval Between Mixing | Spindle #3 | | | |
| --- | --- | --- | --- | --- |
| | 6 Rev./ min. | 12 Rev./ min. | 30 Rev./ min. | 60 Rev./ min. |
| After initial mixing | 725 | 700 | 555 | 460 |
| 1½ hours | 850 | 750 | 660 | 608 |

It can be readily seen from the above data, that the limit of 75% siliceous amino compound is a critical one. When that limit is exceeded, an unsatisfactory thickening result is obtained.

As has been shown, the use of a unique mixture of the siliceous amino compound and hydrogenated castor oil in thickening polyester containing free-flowing compositions is extremely effective and synergistic in its effect in thickening such polyester containing free-flowing material.

While this invention has been described in terms of certain preferred embodiments and illustrated by means of specific examples, the invention is not to be construed as limited except as set forth in the following claims.

Having described our invention, what we claim as new and desire to secure by Letters Patent is:

1. A thickening and thixotropic composition comprising a siliceous amino composition and a finely powdered hydrogenated castor oil, there being present from about 25% to 75% by weight of the entire composition of said siliceous amino composition, said siliceous amino composition being prepared in an aqueous system by reacting (1) a material selected from the group consisting of partial amide salts, amine acid addition salts, imidazoline salts, oxazoline salts and quatenary ammonium salts with (2) at least stoichiometric amounts of a water-soluble silicate salt selected from the class consisting of sodium silicates, potassium silicates and ammonium silicates, and thereafter recovering and drying the resultant siliceous amino composition, and further including the steps of introducing at least one water-soluble aromatic compound selected from the class consisting of water-soluble salts of isophthalic acid and water-soluble salts of terephthalic acid, said aromatic compound being introduced at a point in time prior to the drying of said siliceous amino composition,
    (a) with the proviso that when said water-soluble aromatic compound is present during formation of said siliceous amino composition and the corresponding aromatic acid of said water-soluble aromatic compound does not remain in said siliceous amino composition, maintaining the pH of said aqueous system from about 7 to about 9.5 during the formation of said siliceous amino composition and thereafter washing out said water-soluble aromatic compound,
    (b) with the proviso that when said water-soluble aromatic compound is present during formation of said siliceous amino composition and the corresponding aromatic acid of said water-soluble aromatic compound remains in said siliceous amino composition, maintaining the pH of said aqueous system from 7 to about 9.5 during the formation of said siliceous amino composition and thereafter lowering said pH to from just below about 7 to about 3.0 whereupon the corresponding aromatic acid of said water-soluble aromatic compound precipitates in and around the particles of siliceous amino composition, and
    (c) with the proviso that when said siliceous amino composition is formed in the absence of said water-soluble aromatic compound, maintaining the pH of said aqueous system from about 6.5 to about 9.5 during the formation of said siliceous amino composition and thereafter introducing said water-soluble aromatic compound and adjusting the pH of the system to from just below about 7 to about 3.0 whereupon the corresponding aromatic acid of said water-soluble aromatic compound precipitates in and around the particles of siliceous amino composition.

2. A thickening and thixotropic composition of matter according to claim 1, wherein said siliceous amino composition contains isophthalic acid.

3. A thickening and thixotropic composition of matter according to claim 1, wherein said siliceous amino composition contains terephthalic acid.

4. A thickening and thixotropic composition of matter according to claim 1, wherein said siliceous amino composition contains free silica.

5. A thickened composition of matter comprising a normally free-flowing polyester containing material and from about 0.5% to 10% by weight of said polyester of a second composition consisting essentially of a siliceous amino composition and a finely powdered hydrogenated castor oil, there being present from about 25% to about 75% by weight of siliceous amino composition in said second composition, said siliceous amino composition being prepared in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates, and thereafter recovering and drying the resultant siliceous amino composition, and further including the steps of introducing at least one water-soluble aromatic compound selected from the class consisting of water-soluble salts of isophthalic acid and water-soluble salts of terephthalic acid, said aromatic compound being introduced at a point in time prior to the drying of said siliceous amino composition,
    (a) with the proviso that when said water-soluble aromatic compound is present during formation of said siliceous amino composition and the corresponding aromatic acid of said water-soluble aromatic compound does not remain in said siliceous amino composition, maintaining the pH of said aqueous system from about 7 to about 9.5 during the formation of said siliceous amino composition and thereafter washing out said water-soluble aromatic compound,
    (b) with the proviso that when said water-soluble aromatic compound is present during formation of said siliceous amino composition and the corresponding aromatic acid of said water-soluble aromatic compound remains in said siliceous amino composition, maintaining the pH of said aqueous system from 7 to about 9.5 during the formation of said siliceous amino composition and thereafter lowering said pH to from just below about 7 to about 3.0 whereupon the corresponding aromatic acid of said water-soluble aromatic compound precipitates in and around the particles of siliceous amino composition, and
    (c) with the proviso that when said siliceous amino composition is formed in the absence of said water-soluble aromatic compound, maintaining the pH of said aqueous system from about 6.5 to about 9.5 during the formation of said siliceous amino composition and thereafter introducing said water-soluble aromatic compound and adjusting the pH of the system to from just below about 7 to about 3.0 whereupon the corresponding aromatic acid of said water-soluble aromatic compound precipitates in and around the particles of siliceous amino composition.

6. A process of thickening a normally free-flowing polyester containing material comprising the steps of adding to said polyester material and blending therewith from about 0.5% to about 10% by weight of said polyester material of a second composition, said second composition containing siliceous amino composition and a finely powdered hydrogenated castor oil, said siliceous amino composition being present in amounts of from about 25% to about 75% by weight of said composition, said siliceous amino composition being prepared in an aqueous system by reacting (1) a material selected from the group consisting of partial amide salts, amine acid addition salts, imidazoline salts, oxazoline salts and quaternary ammonium salts with (2) at least stoichiometric amounts of a water-soluble silicate salt selected from the class consisting of sodium silicates, potassium silicates and ammonium silicates, and thereafter recovering and drying the resultant siliceous amino composition and further including the steps of introducing at least one water-soluble aromatic compound selected from the class consisting of water-soluble salts of isophthalic acid and water-soluble salts of terephthalic acid, said aromatic compound being introduced at a point in time prior to the drying of said siliceous amino composition, (a) with the proviso that when said water-soluble aromatic compound is present during formation of said siliceous amino composition and the corresponding aromatic acid of said water-soluble aromatic compound does not remain in said siliceous amino composition, maintaining the pH of said aqueous system from about 7 to about 9.5 during the formation of said siliceous amino composition and thereafter washing out said water-soluble aromatic compound, (b) with the proviso that when said water-soluble aromatic compound is present during formation of said siliceous amino composition and the corresponding aromatic acid of said water-soluble aromatic compound remains in said siliceous amino composition, maintaining the pH of said aqueous system from 7 to about 9.5 during the formation of said siliceous amino composition and thereafter lowering said pH to from just below about 7 to about 3.0 whereupon the corresponding aromatic acid of said water-soluble aromatic compound precipitates in and around the particles of siliceous amino composition, and (c) with the proviso that when said siliceous amino composition is formed in the absence of said water-soluble aromatic compound, maintaining the pH of said aqueous system from about 6.5 to about 9.5 during the formation of said siliceous amino composition and thereafter introducing said water-soluble aromatic compound and adjusting the pH of the system to from just below about 7 to about 3.0 whereupon the corresponding aromatic acid of said water-soluble aromatic compound precipitates in and around the particles of siliceous amino composition.

7. A process according to claim 6, wherein said siliceous amino composition contains isophthalic acid.

8. A process according to claim 6, wherein said siliceous amino composition contains terephthalic acid.

9. A process according to claim 6, wherein said siliceous amino composition contains free silica.

References Cited by the Examiner

UNITED STATES PATENTS

| | | | |
|---|---|---|---|
| 2,573,650 | 10/1951 | Peterson | 252—28 |
| 2,717,214 | 9/1955 | Marotta et al. | 260—22 |
| 2,967,828 | 1/1961 | Ihde | 252—28 |
| 3,129,178 | 4/1964 | Ihde | 252—28 |

LEON J. BERCOVITZ, *Primary Examiner.*

J. W. BEHRINGER, R. W. GRIFFIN,
*Assistant Examiners.*